UNITED STATES PATENT OFFICE.

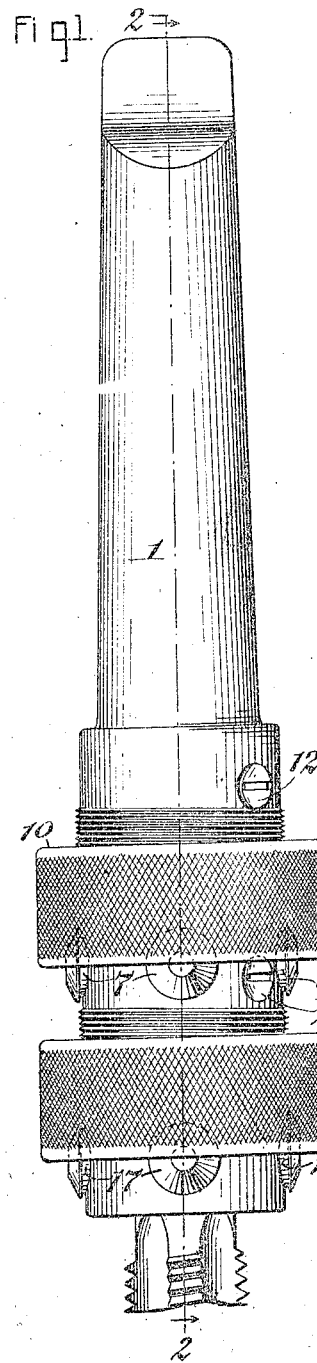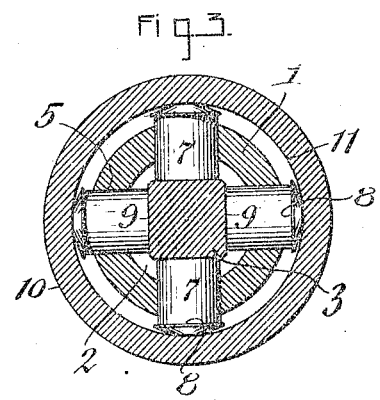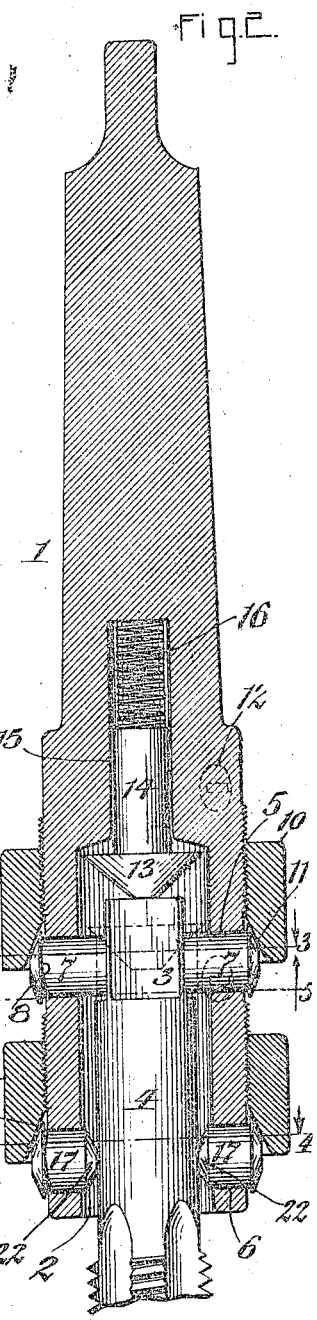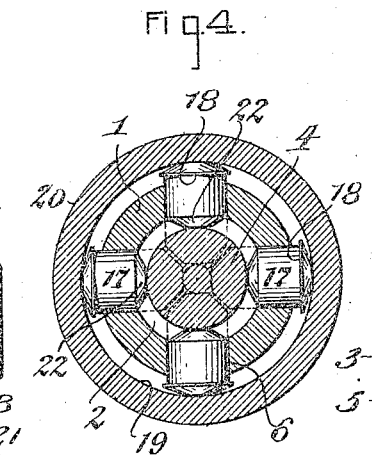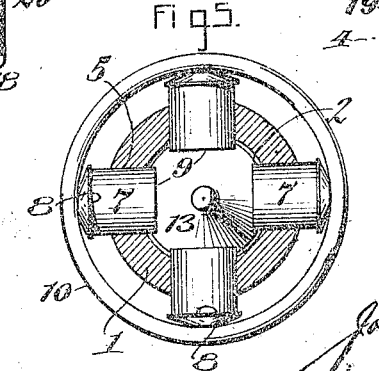

JOSEPH M. HOUSEL, OF BRADFORD, PENNSYLVANIA, ASSIGNOR OF ONE-HALF TO EDMUND R. CALDWELL, OF BRADFORD, PENNSYLVANIA.

CHUCK.

1,129,491. Specification of Letters Patent. Patented Feb. 23, 1915.

Application filed July 24, 1914. Serial No. 852,929.

*To all whom it may concern:*

Be it known that I, JOSEPH M. HOUSEL, a citizen of the United States, residing at Bradford, in the county of McKean and State of Pennsylvania, have invented new and useful Improvements in Chucks, of which the following is a specification.

This invention relates to a chuck which is designed more particularly for holding drills, taps, bits and the like while rotating the same by means of a drill press or similar machine during the operation of boring, drilling or tapping an article by means of the tool which is being held.

It is the object of this invention to produce a chuck of this character which is simple, durable and inexpensive in construction, which will permit of securely and reliably holding bits, drills, taps or similar tools regardless of whether the shanks of the same are complete or partly broken off, and which enables such tools to be quickly and conveniently secured in place as well as removed from the chuck.

In the accompanying drawings: Figure 1 is a side elevation of a chuck constructed in accordance with my improvements and a screw threading tap secured in the same. Fig. 2 is a vertical section of the same taken on line 2—2, Fig. 1. Figs. 3 and 4 are horizontal sections taken in the correspondingly numbered lines in Fig. 2, looking downwardly. Fig. 5 is a horizontal section taken in line 5—5 looking upwardly but showing the shank of the tool omitted.

Similar characters of reference indicate corresponding parts throughout the several views.

1 represents the body of the chuck which is preferably of circular and vertically elongated form and adapted to be secured at its upper end to the spindle or shaft of a drill press or other machine for rotating this body. In its lower or front end this body is provided with an axial opening or socket 2 which is adapted to receive the shank of the tool which is to be held and turned by the chuck. Although various tools may be held by this chuck that shown in the drawings, for example is a screw threading tap which has the inner or rear part 3 of its shank constructed of substantially square form in cross section while the front or outer part 4 of this shank is made of cylindrical or round form, as shown in Figs. 2, 3 and 4.

5 represents a plurality of rear guide openings arranged in an annular row in the chuck body around the rear part of the socket and extending radially from the bore of the socket to the periphery or exterior of the chuck body. 6 represents another annular row of guide openings formed in the front or outer part of the chuck body around the adjacent part of the socket and extending radially from the bore of the socket to the periphery of the body. Sliding radially within the upper or rear guide openings are a plurality of rear gripping or driving pins 7 which are adapted to engage their inner ends with different portions of the rear or inner end of the tool shank. The inward movement of these rear gripping pins is limited by enlargements arranged at the outer ends thereof and forming inwardly facing shoulders 8 which are adapted to engage with the periphery of the chuck body and thereby prevent these gripping pins from passing wholly into the socket and either becoming displaced or detached from the body. The inner ends of the rear gripping pins are preferably provided with flat bearing faces 9 which are arranged at right angles to the axes of these pins and the several pins of this set are arranged on different quarters of the circle so that their flat inner ends may bear properly against the flat faces on the rear square portion of the tool shank, as shown in Figs. 2 and 3. The rear gripping pins are pressed against the rear part of the tool shank by an upper or rear clamping sleeve 10 having an internal screw thread in its rear part which engages with a corresponding external thread on the adjacent part of the chuck body while the front or lower part of this clamping ring is provided internally with a conical downwardly flaring bearing face 11 which engages with the outer enlarged ends of the rear gripping pins. Upon turning this rear clamping sleeve so that the same moves downwardly or forwardly on the chuck body its conical face engages with the outer ends of the rear gripping pins and presses the same inwardly against the tool shank while upon turning this sleeve in the opposite direction its conical face will be moved away from the outer ends of the rear gripping pins and release the pressure of the latter against the tool shank.

The movement of the rear clamping sleeve in a direction in which its conical face moves away from the rear gripping pins is preferably limited so that the lower or front end of this sleeve will not entirely clear the path of the companion gripping pins and thereby prevent the latter from dropping or sliding wholly out of the chuck body. Although various means may be employed for thus limiting the retracting movement of the upper clamping sleeve this is preferably effected by means of a stop screw 12 secured to the upper part of the chuck body above the rear or upper clamping sleeve and in position to be engaged by the upper end of the latter.

Upon screwing the rear clamping sleeve upwardly and removing the tool shank from the socket the upper or rear set of gripping or driving pins are preferably pushed outwardly so as to permit of readily and conveniently inserting the tool shank in the socket. The preferred means for this purpose which are shown in the drawings comprise a downwardly tapering conical presser head 13 arranged in the upper or rear end of the socket above the rear set of gripping pins, a guide stem 14 carrying at its lower or front end the presser head while its upper or rear part is guided in an axial guideway 15 formed in the chuck body and extending upwardly or rearwardly from the socket, and a spring 16 which operates constantly to press the stem and presser head downwardly and which is preferably arranged in the guideway so that its lower end bears against the upper end of the stem and its upper end bears against the upper end of the guideway 15, as shown in Fig. 2. When no tool shank is present in the socket the conical presser head 13 is pressed downwardly by the spring 16 into engagement with the inner ends of the rear set of gripping pins, thereby spreading the latter and holding them in this position so as to permit of conveniently and quickly introducing the shank of the tool into the socket without meeting any obstructions. The operative position of this presser head against the gripping pins is indicated by dotted lines in Fig. 2. Upon inserting the shank of the tool into the socket and between the several gripping pins of the rear set the upper or rear end of this shank pushes the presser head 13 upwardly or rearwardly away from the respective gripping pins, as shown in Fig. 2, and retains this head in this position so long as the tool shank is in its operative position within the chuck.

In the front or lower set of guide openings 6 a plurality of lower or front gripping or centering pins 17 slide radially so that their inner ends may be engaged with or disengaged from the adjacent part of the tool shank which, in the case illustrated in Figs. 2 and 4, consists of the front cylindrical part of the shank of the screw tap. The members of the lower or front set of gripping pins are preferably somewhat shorter than the upper rear set of pins in order to adapt the same to the front part of the tool shank which is of somewhat larger diameter than the rear part thereof. The inward movement of the lower gripping pins is limited so as to prevent the same from moving into the socket of the body and becoming detached, this being effected by means of enlargements at the outer ends of the front gripping pins forming inwardly facing shoulders 18 thereon which are adapted to engage with the periphery of the chuck body. The front gripping pins are pressed inwardly into engagement with the tool shank by engagement with the outer ends of these gripping pins of a downwardly tapering conical bearing face 19 formed at the lower end of a lower or front clamping sleeve 20 which is provided in its upper or rear part with an internal screw thread engaging with an external screw thread on the adjacent part of the periphery of the chuck body. A downward movement of the lower clamping sleeve causes the lower gripping pins to be pressed inwardly for clamping the tool shank while the upward movement of this sleeve permits the respective pins to release the tool shank. The upward movement of the lower gripping sleeve is limited by means of a stop screw 21 arranged on the chuck body and adapted to be engaged by the upper end of the lower clamping sleeve before the lower end or edge of this sleeve clears the lower gripping pins.

The inner ends of the lower gripping pins are preferably of inwardly tapering conical form, as shown at 22 in Figs. 2 and 4, whereby upon pushing the shank of a tool into the socket of the chuck body, this shank by engagement with the tapering inner ends of the lower gripping pins will cause the latter to be spread and make way for the introduction of the tool shank into the socket. In the case of small sizes of chucks or chucks which are adapted to grip the tool shanks of comparatively small diameter the provision of inwardly tapering ends on the gripping pins also permits the several members of such gripping pins to approach each other for properly engaging a small shank without interference between the inner ends of the respective gripping pins, as indicated by dotted lines in Fig. 4.

In the use of my improved chuck illustrated in the drawings the upper or rear set of gripping pins is used primarily for driving the tool while the lower set of gripping pins is used essentially for centering the tool or keeping the same in axial alinement with the chuck body, this being due to the fact that the rear set of pins engages the flat sided part of the tool shank while the front set of pins engages with the round part of the tool shank, as is usually the case when a tool is new and its shank is complete. When, however, the upper square part of the tool shank has been broken off accidentally a sufficiently strong grip may be obtained on the remaining round part of the shank by the front and rear set of pins for causing this tool to turn with the chuck, thereby permitting of using up tools having broken shanks which have heretofore usually been thrown away, scrapped or discarded at considerable loss. This chuck therefore permits of effecting a considerable saving owing to its capacity to hold tools with broken shanks effectively and reliably as well as new tools having any other form of shank.

This chuck is very simple and compact in construction, it has but few parts which can be easily operated for either inserting a tool in the chuck or removing the same therefrom. Furthermore, the same contains no delicate parts which are liable to get out of order to become clogged and the same contains no projecting parts which are liable to catch in the clothing, thereby rendering the same perfectly safe and not liable to injure the workmen.

I claim as my invention:

1. A chuck comprising a body having an axial opening or socket adapted to receive the shank of a tool, an axial guideway at the inner end of said socket, and a plurality of radial guide openings extending from said socket to the periphery of said body, a plurality of gripping pins movable radially in said guide openings and adapted to engage their inner ends with said tool shank, a clamping sleeve having a screw connection with the periphery of said body and provided with a conical face adapted to engage with the outer ends of said gripping pins, a presser head arranged in said socket and provided with a conical face adapted to engage with the inner ends of said pins and having a guide stem arranged in said axial guideway, and a spring operating to move said stem and head in a direction for engaging the conical face of the head with said pins.

2. A chuck comprising a body having an axial opening or socket adapted to receive the shank of a tool, an axial guideway at the inner end of said socket and a plurality of radial guide openings extending from said socket to the periphery of said body, a plurality of gripping pins movable radially in said guide openings and adapted to engage their inner ends with said tool shank, a clamping sleeve having a screw connection with the periphery of said body and provided with a conical face adapted to engage with the outer ends of said gripping pins, a presser head arranged in said socket and provided with a conical face adapted to engage with the inner ends of said pins and having a guide stem arranged in said axial guideway, and a spring operating to move said stem and head in a direction for engaging the conical face of the head with said pins and arranged between the inner end of said axial guideway and said stem.

3. A chuck comprising a body having an axial opening or socket adapted to receive the shank of a tool, a plurality of rear radial guide openings, a plurality of front radial guide openings, said guide openings extending from the bore of said socket to the periphery of the body, a plurality of rear gripping pins movable radially in said rear guide openings and adapted to engage the inner part of the tool shank, a plurality of front gripping pins movable radially in said front guide openings and adapted to grip the outer part of said tool shank, a rear clamping sleeve having a screw connection with the exterior of said body and provided with a conical face engaging with the outer ends of said rear gripping pins, and a front clamping sleeve having a screw connection with the exterior of said body and provided with a conical face engaging with the outer ends of the front gripping pins.

4. A chuck comprising a body having an axial opening or socket adapted to receive the shank of a tool, a plurality of rear radial guide openings, a plurality of front radial guide openings, said guide openings extending from the bore of said socket to the periphery of the body, a plurality of rear gripping pins movable radially in said rear guide openings and adapted to engage the inner part of the tool shank, a plurality of front gripping pins movable radially in said front guide openings and adapted to grip the outer part of said tool shank, a rear clamping sleeve having a screw connection with the exterior of said body and provided with a conical face engaging with the outer ends of said rear gripping pins, and a front clamping sleeve having a screw connection with the exterior of said body and provided with a conical face engaging with the outer ends of the front gripping pins, said rear pins having flat inner ends which are adapted to engage with the flat sided inner part of a tool shank and said front pins having conical inner ends which are adapted to engage with the cylindrical outer part of the tool shank.

Witness my hand this 22nd day of July, 1914.

JOSEPH M. HOUSEL.

Witnesses:
 E. J. JONES,
 H. M. WICK.